United States Patent [19]
Wilson

[11] Patent Number: 5,785,919
[45] Date of Patent: Jul. 28, 1998

[54] METHOD OF MANUFACTURE OF STRUCTUAL CELLULAR COMPONENTS

[75] Inventor: Robert Samuel Wilson, Belfast, Northern Ireland

[73] Assignee: Short Brothers PLC, Belfast, Northern Ireland

[21] Appl. No.: 605,146

[22] PCT Filed: Jun. 28, 1995

[86] PCT No.: PCT/GB95/01511

§ 371 Date: Mar. 25, 1996

§ 102(e) Date: Mar. 25, 1996

[87] PCT Pub. No.: WO96/00650

PCT Pub. Date: Jan. 11, 1996

[30] Foreign Application Priority Data

Jun. 30, 1994 [GB] United Kingdom ............... 9413158

[51] Int. Cl.$^6$ ............... B29C 35/08; B29C 41/02
[52] U.S. Cl. ............... 264/401; 264/135; 264/250; 264/265; 264/497
[58] Field of Search ............... 264/135, 250, 264/265, 401, 497

[56] References Cited

U.S. PATENT DOCUMENTS

| | | | |
|---|---|---|---|
| 3,977,492 | 8/1976 | Hankel | 428/116 X |
| 4,257,998 | 3/1981 | Diepenbrock, Jr. et al. | 428/116 X |
| 4,265,955 | 5/1981 | Harp et al. | 428/116 |
| 4,318,453 | 3/1982 | Rose et al. | 428/118 X |
| 4,421,201 | 12/1983 | Nelsen et al. | 428/116 X |
| 4,594,120 | 6/1986 | Bourland, Jr. et al. | 428/116 X |
| 5,414,232 | 5/1995 | Wilson | 428/116 X |
| 5,415,820 | 5/1995 | Furuta et al. | 264/401 |
| 5,490,602 | 2/1996 | Wilson et al. | 428/137 X |
| 5,543,198 | 8/1996 | Wilson | 428/116 |
| 5,545,367 | 8/1996 | Bae et al. | 264/401 |

FOREIGN PATENT DOCUMENTS

| | | |
|---|---|---|
| 250 121 | 12/1987 | European Pat. Off. . |
| 336 260 | 10/1989 | European Pat. Off. . |
| 429 196 | 5/1991 | European Pat. Off. . |
| 4125534 | 2/1993 | Germany . |
| 1463918 | 2/1977 | United Kingdom . |
| 2019767 | 11/1979 | United Kingdom . |
| 2019983 | 11/1979 | United Kingdom . |
| 2223448 | 4/1990 | United Kingdom . |

*Primary Examiner*—Leo B. Tentoni
*Attorney, Agent, or Firm*—Lyon & Lyon LLP

[57] ABSTRACT

A method of producing a structural component (12) from a primary wall structure (14) which defines a plurality of juxtaposed primary cells (15) which extend between and which are open to the front face and the rear face of the component (12) and a secondary wall structure (16) within the primary wall structure (14) which divides each primary cell (15) into two or more subcells (151, 152) comprises first forming the primary wall structure (14) and then forming the secondary wall structure (16) within the primary wall structure (14) by bringing the primary wall structure (14) into a condition in which it lies within a body of liquid the surface of which provides or is provided with a photosensitive layer and in which the photosensitive layer is at a predetermined level in each primary cell (15) and exposing the photosensitive layer to a radiation source to bring the photosensitive layer to a consolidated state within the primary wall structure (14) to form the secondary wall structure (16). Where the component 12 is a noise attenuation panel, the secondary wall structure (16) may be so formed as to provide for the required sound absorption properties while providing substantially no support for structural loads.

36 Claims, 8 Drawing Sheets

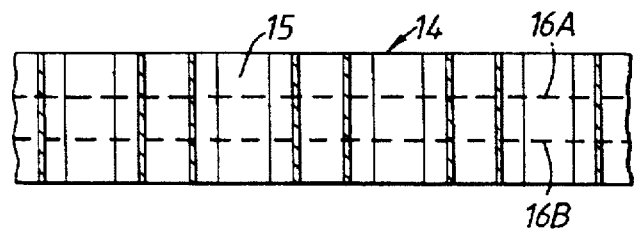
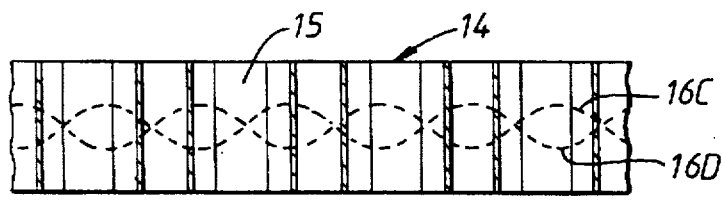
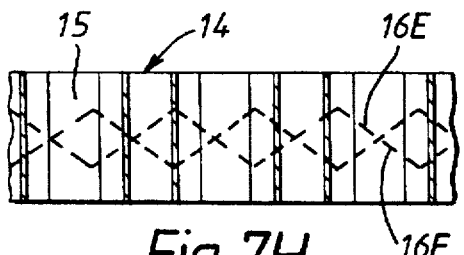 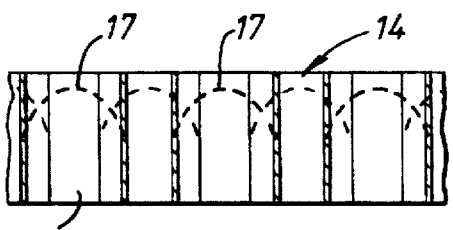
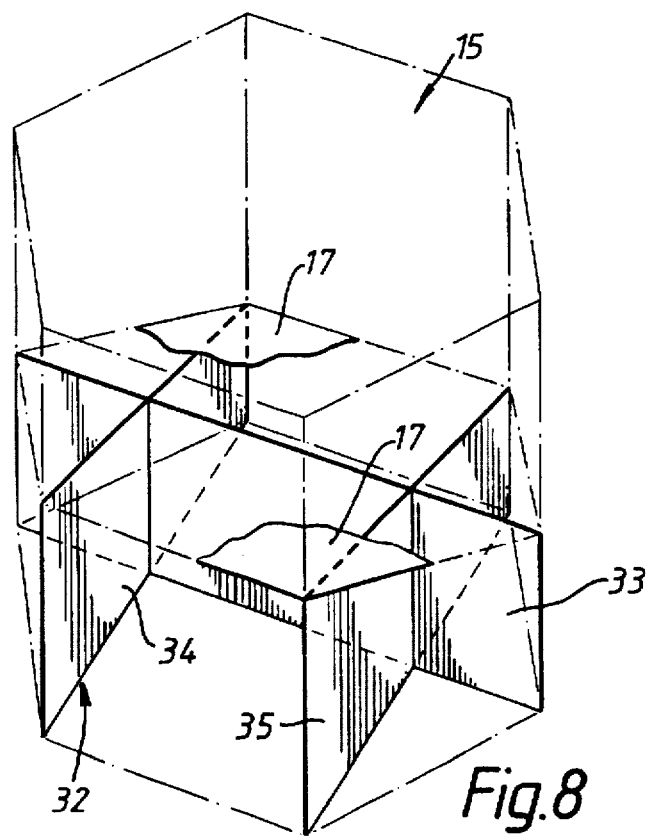

METHOD OF MANUFACTURE OF STRUCTURAL CELLULAR COMPONENTS

BACKGROUND OF THE INVENTION

The present invention relates to structural cellular components and is particularly although not exclusively concerned with a structural cellular component for a noise attenuation panel.

In patent application publication No. GB-A-2223448 a noise attenuation panel is disclosed comprising a backing component part, a facing component part and a cellular component part having a multiplicity of open-ended juxtaposed cells. The backing component part extends across the ends of the cells of the cellular component part at the rear thereof and the facing component part extends across the ends of the cells of the cellular component part at the front thereof. The facing component part comprises or includes an outer facing sheet which is made of a porous permeable thermoplastics material and preferably the porous permeable thermoplastics material is produced by powder sintering of a thermoplastics material.

In GB-A-2223448 the cellular component part comprises a front cellular sub-component having a multiplicity of open-ended juxtaposed cells, a rear cellular sub-component having a further multiplicity of open-ended juxtaposed cells and a septum component which extends across the ends of the cells of the rear cellular sub-component at the front thereof and the ends of the cells of the front cellular sub-component at the rear thereof. The septum component is made of a porous permeable thermoplastics sheet material and is preferably produced by powder sintering of a thermoplastics material.

While the noise attenuation panel disclosed in GB-A-2223448 has been found to be successful for use in aero engine environments, it suffers from a number of disadvantages. In particular, in order to include the septum component in the noise attenuation panel, it is necessary to construct two separate cellular sub-components and join them together by means of the septum component or to split or cut the cellular component into two sub-components and join them to the septum component. Where two septum components are required then three separate cellular sub-components need to be provided leading to complex manufacturing procedures. Furthermore, since the or each septum component is in the form of a continuous sheet of material, the configuration of the septum within the panel is limited insofar as it is required to lie in a continuous surface.

In GB-A-2252076, there is disclosed a noise attenuation panel which has one or more septum components, but which does not require the provision of cellular sub-components, and there is also disclosed a method of manufacturing the panel.

In GB 2252076 the noise attenuation panel comprises a cellular component which has a front face and a rear face and a multiplicity of cells each of which extends from the front face to the rear face and is formed by wall portions which extend from the front face to the rear face, and is characterised by the provision in each cell in a predetermined position therein where the wall portions forming the cell are continuous of a cell dividing septum element which extends across the cell and at which it is secured to the wall portions to divide the cell into two subcells.

The method of manufacturing the noise attenuation panel disclosed in GB 2252076 comprises the steps of first forming the cellular component without the provision in each cell of a cell dividing septum element, bringing a septum sheet into engagement with the cellular component such that the edges of the wall portions at a face of the cellular component cut through the septum sheet to form a multiplicity of cell dividing septum elements and allowing or causing each cell dividing septum element formed from the septum sheet to advance in the cell to a predetermined position therein at which it is secured to the wall portions of the cell thereby to divide the cell into two subcells.

In an embodiment of the invention disclosed in GB 2252076 the method includes the further step of bringing one or more further septum sheets into engagement with the cellular component such that the edges of the wall portions at a face of the cellular component cut through the or each further septum sheet and allowing or causing each cell dividing septum element formed from the or each further septum sheet to advance in the cell to a predetermined further position at which it is secured to the wall portions of the cell thereby to divide the cell into three or more subcells.

In the embodiments of the invention specifically described and illustrated in GB 2252076, the cell dividing septum elements are fixed in position in the cells so as to lie in a plane or curved continuous surface traversing the cells. It is however suggested that the septum elements produced by cutting through the septum sheet may be fixed in position at predetermined other positions in the cells.

In patent application publication No. GB-B-2019983 there is disclosed a sound attenuating panel comprising a single layer of cellular honeycomb core with a separately formed acoustic planar septum fixed internally in the core and dividing the layer of the core along a direction transverse to the axis of the cells of the honeycomb core, the acoustic septum being in the form of a continuous array made up of a plurality of individual co-planar septum members in mutually adjacent cells and permanently attached to the sides of the adjacent cells of the core.

Several panels forming the subject of the invention disclosed in GB-B-2019983 are disclosed. In a first of the panels disclosed, the acoustic planar septum is arranged to lie in a plane which is perpendicular to the axis of the cells of the honeycomb core. In another disclosed panel the septum lies in a plane inclined to the axis of the cells. In yet another disclosed panel, the acoustic planar septums formed internally in the core are positioned at an angle to each other so that the planar septums intersect each other to form a non-planar geometric configuration. In still yet another disclosed panel, the septums are positioned parallel to each other with each of the planar septums at a depth which is different from that of at least one of the other planar septums in the cells of the core.

In GB 2019767, there is disclosed a method of making the sound attenuation panels disclosed in GB-B-2019983 which comprises placing a wax-like mandrel material within a frame and warming the mandrel to a temperature so that the mandrel can be easily cut by a single layer of a cellular honeycomb core, placing on top of the mandrel a septum material having a desired septum thickness, positioning the core above the septum material, and pressing the core through the septum material and into the mandrel until the septum material is positioned at a desired depth internally in the core, stabilising the septum material and melting the mandrel, thereby to provide an internal septum in each cell of the single layer of the core.

The manufacture of the noise attenuation panels by the methods disclosed in GB 2252076 and GB 2019767 require the steps of bringing the cellular component or honeycomb core into engagement with a sheet of septum material such that the edges of the walls of the cellular component or core cut through the septum sheet placed on top of this mandrel to form the multiplicity of cell dividing septum elements and then bringing the septum elements to preselected positions within each cell of the core to divide each cell into two subcells.

In the manufacture of the sound attenuation panels by the method disclosed in GB 2019767, a wax-like mandrel material is placed within a frame and the material warmed to a temperature such that the mandrel can easily be cut by the wall portions of the honeycomb core and the core is pressed through the septum material and into the mandrel until the septum material is positioned at the required depth internally in the core, following which the septum material is stabilised and the mandrel removed by melting the wax-like material from which it is made.

It will however be appreciated that the septum sheet employed in the manufacturing methods disclosed in GB 2252076 and GB 2019767 requires to be predetermined where one or more apertures are required in each cell dividing element and that close tolerance registration is required between the cellular core and the septum sheet during the cutting of the sheet by the core.

Furthermore, the need in GB 2019767 for a support mandrel for the septum sheet imposes limitations on the positions which the individual septum elements can take up within the cells of the cellular core.

SUMMARY OF THE INVENTION

According to a first aspect of the present invention, there is provided a method of producing a structure which has a front face, a rear face, a primary wall structure which defines a primary cell which extends between the front face and the rear face and which is open to the front face and to the rear face of the component and a secondary wall structure within the primary wall structure which divides the primary cell into two or more subcells, the method comprising first forming in a primary processing step the primary wall structure and then in a secondary processing step forming the secondary wall structure or an elemental part thereof within the primary wall structure by bringing the primary wall structure into a condition in which it lies within a body of liquid the surface of which provides or is provided with a photosensitive layer and in which the photosensitive layer is at a predetermined level in the primary cell of the primary wall structure at which the secondary wall structure or the elemental part of the secondary wall structure is to be formed, and exposing the photosensitive layer to a radiation source over a predetermined area thereof to bring the photosensitive layer to a consolidated state within the primary cell of the primary wall structure to form the secondary wall structure or the elemental part thereof.

In an embodiment of the invention hereinafter to be described the primary cell of the primary wall structure is one of a plurality of juxtaposed primary cells each of which extends between the front face and the rear face of the component and is open to the front face and to the rear face of the component and the secondary processing step comprises bringing the primary wall structure into a condition in which it lies within the body of liquid with the photosensitive layer being present in two or more of the cells and exposing the layer to the radiation source to produce a secondary wall structure or an elemental part thereof in two or more of the primary cells.

In an embodiment of the invention as hereinafter to be described the predetermined level is a first of a plurality of predetermined levels in the or each primary cell; an elemental part of the secondary wall structure is formed at the first predetermined level in the primary cell or cells and is a first of a plurality of elemental parts; and the secondary processing step of forming the first elemental part is the first of a plurality of successive secondary processing steps in which photosensitive layers are successively positioned at the predetermined levels in the primary wall structure and exposed to the radiation source over predetermined areas thereof to bring the layers at those levels to consolidated states within the primary wall structure to form the secondary wall structure. The secondary processing steps are preferably carried out in such a manner as to form a secondary wall structure of contiguous elemental parts.

In an embodiment of the invention hereinafter to be described the predetermined area over which the photosensitive layer in the primary cell or one or more of the primary cells is exposed to the radiation source is such that the or each secondary wall structure or elemental part divides the primary cell or each of the primary cells into a first subcell which extends from the secondary wall structure towards the front face of the component and a second subcell which extends from the secondary wall structure towards the rear face of the component.

In an embodiment of the invention hereinafter to be described the predetermined area over which the photosensitive layer in the or each primary cell is exposed is so chosen as to produce in the primary cell or cells an apertured secondary wall structure or an apertured elemental part to provide communication between the two subcells. The predetermined areas in successive processing steps are then so selected as to form a secondary wall structure having one or more apertures therethrough which together produce a predetermined communication path or paths through the secondary wall structure.

In embodiments of the invention hereinafter to be described the predetermined areas in successive secondary processing steps are so selected as to produce one or more communication paths the or each of which is formed as:

(i) an aperture which extends through the secondary wall structure and which is of constant cross section. The principal axis of the or each aperture is then a straight line perpendicular or inclined to the front face of the component, (ii) an aperture which extends through the secondary wall structure and which has a cross section which varies along its length, or (iii) an aperture in each elemental part of the secondary wall structure, which extends therethrough and which is offset from the aperture in the next succeeding elemental part and in which communication is provided between the apertures in adjacent elemental parts thereby to produce a communication path which follows a prolonged course through the secondary wall structure.

In an embodiment the invention hereinafter to be described the or each secondary processing step is such as to produce a cell dividing wall portion of the secondary wall structure or an elemental part thereof in each of the primary cells.

In an embodiment of the invention hereinafter to be described the secondary processing step is such as to produce a cell dividing wall portion of the secondary wall structure or an elemental part thereof in each of the primary cells which lies in a plane common to the other or others of the secondary wall structures or elemental parts and in a specific embodiment lie in a plane parallel to the front face of the component.

In an embodiment of the invention hereinafter to be described the predetermined areas in successive secondary processing steps are so selected as to produce a secondary wall structure having two or more cell dividing wall portions which divide the or each primary cell into three or more subcells, a foremost of which extends from a foremost of the cell dividing portions to the front face of the component, a rearmost of which extends from the rearmost of the cell dividing portions to the rear face of the component with the or each intermediate subcell extending from one cell dividing portion to the other or the next cell dividing portion.

In an embodiment of the invention hereinafter to be described the predetermined areas in successive secondary processing steps are so selected as to produce a secondary wall structure having a cell dividing portion which divides the primary cell into a first subcell which extends from the cell dividing portion towards the front face of the component and a second subcell which extends from the cell dividing portion towards the rear face of the component and a support portion which extends from the cell dividing portion to either the front face or the rear face of the component, whereby the cell dividing portion is held at the predetermined level within the primary cell by its support from the support portion.

In a specific embodiment of the invention hereinafter to be described the support portion is a support wall or walls which extends or extend from either the front face of the component or from the rear face of the component to the cell dividing portion.

In yet another embodiment of the invention hereinafter to be described the predetermined areas in successive secondary processing steps are so selected as to produce a secondary wall structure having cell dividing wall portions which divide the or each primary cell into a first subcell which extends from the front face of the component to the rear face of the component and which is bounded by the secondary wall structure and a first part of the primary cell and a second subcell which extends from the front face of the component to the rear face of the component and which is bounded by the secondary wall structure and another part of the primary cell.

In a specific embodiment of the invention hereinafter to be described the predetermined areas in the successive secondary processing steps are so selected as to produce a secondary wall structure which includes a further wall portion or wall portions which divides or divide the or each primary cell into one or more further subcells which extends or extend from the front face of the component to the rear face of the component and which is or are bounded by the further wall portions and further parts of the primary cell.

Preferably, in the predetermined areas in successive secondary processing steps are so selected as to produce a secondary wall structure in which the wall portions lie in a plurality of surfaces which traverse the primary cell structure from one primary cell to another in a predetermined configuration.

In a specific embodiment of the invention hereinafter to be described the predetermined areas in successive secondary processing steps are so selected that the surfaces in which the wall portions lie form a concentric configuration. The predetermined areas in successive secondary processing steps may be so selected that the surfaces in which the cell dividing wall portions lie are arranged with a radial spacing between adjacent pairs of surfaces which is not constant. The predetermined areas in successive secondary processing steps may alternatively be so selected that the surfaces in which the cell dividing wall portions lie are arranged with spacings between adjacent pairs of surfaces which is constant.

In an embodiment of the invention hereinafter to be described the predetermined areas in successive secondary processing steps are so selected that the cell dividing wall portions comprise a plurality of first wall portions which lie in spaced parallel first surfaces which extend in a first predetermined direction and a plurality of second wall portions which lie in spaced parallel second surfaces which extend in a second predetermined direction. The predetermined areas in successive secondary processing steps may then be so selected that the first and second parallel surfaces are at right angles to each other.

Alternatively, the predetermined areas in successive secondary processing steps are so selected as to form a secondary wall structure which lies in a surface of pyramidal form.

In a further embodiment of the invention hereinafter to be described the predetermined areas in successive secondary processing steps are so selected and the material of the photosensitive layer so chosen as to form a secondary wall structure which is of a predetermined flexibility and which lies in a surface so curved as to permit flexing of the primary wall structure without fracture of the secondary wall structure.

In a specific embodiment of the invention hereinafter to be described the predetermined areas in successive secondary processing steps are so selected that the secondary wall structure comprises a wall portion which follows a curved surface having one or more inflections.

Preferably, the primary wall structure is formed from a selected first material; the photosensitive layer is formed from a selected second material which is bondable to the selected first material; and the step of bringing the photosensitive layer to the consolidated state within the or each primary cell bonds the secondary wall structure to the primary wall structure at the predetermined level in the primary cell.

In an embodiment of the invention hereinafter to be described the photosensitive layer is a photosensitive liquid layer at the surface of the body of liquid. Preferably, the body of liquid is a photosensitive liquid and the photosensitive layer is formed by the surface layer of the photosensitive liquid.

Alternatively, the photosensitive layer is a heat fusible powder layer which is applied to the surface of the body of liquid and which is consolidated in the predetermined area by sintering under radiation generated by the radiation source.

The radiation source may conveniently take the form of a laser beam generating and scanning device which so directs and activates the beam as to expose the photosensitive layer in the predetermined area to consolidate the layer in that area.

Alternatively, the radiation source may provide a non-localised radiation and the photosensitive layer is exposed to the radiation over the predetermined area by arranging for transmission of consolidating radiation from the source to the predetermined area only. A stencil may be interposed between the radiation source and the photosensitive layer which provides for exposure of the photosensitive layer to consolidating radiation at the predetermined area only.

In a further embodiment of the invention hereinafter to be described, the step of forming the primary wall structure in the primary processing step comprises forming a wall structure defining a plurality of juxtaposed cells and pretreating the walls of the cells by subjecting the structure to either a chemical etch dip or a cell wall coating dip to facilitate bonding of the secondary wall structures to the primary wall structure.

BRIEF DESCRIPTION OF THE DRAWINGS

Embodiments of the invention according to its different aspects will now be described by way of example with reference to the accompanying drawings in which:

FIGS. 7A to 7I are schematic sectional scrap elevational views of structural cellular components produced by the processing apparatus illustrated in FIG. 2, showing a primary wall structure within which are included secondary wall structures in a variety of different configurations.

FIG. 8 is a schematic isometric view of a single primary cell (shown in chain-dot line) of the primary wall structure of the structural cellular component the secondary wall structure of which is produced by the processing apparatus of FIG. 2 and illustrating support walls which are also produced by the processing apparatus illustrated in FIG. 2 and which serve to support a cell dividing portion of the secondary wall structure at a predetermined level within the primary cell.

DETAILED DESCRIPTION OF THE PREFERRED EMBODIMENT

Figure 1:
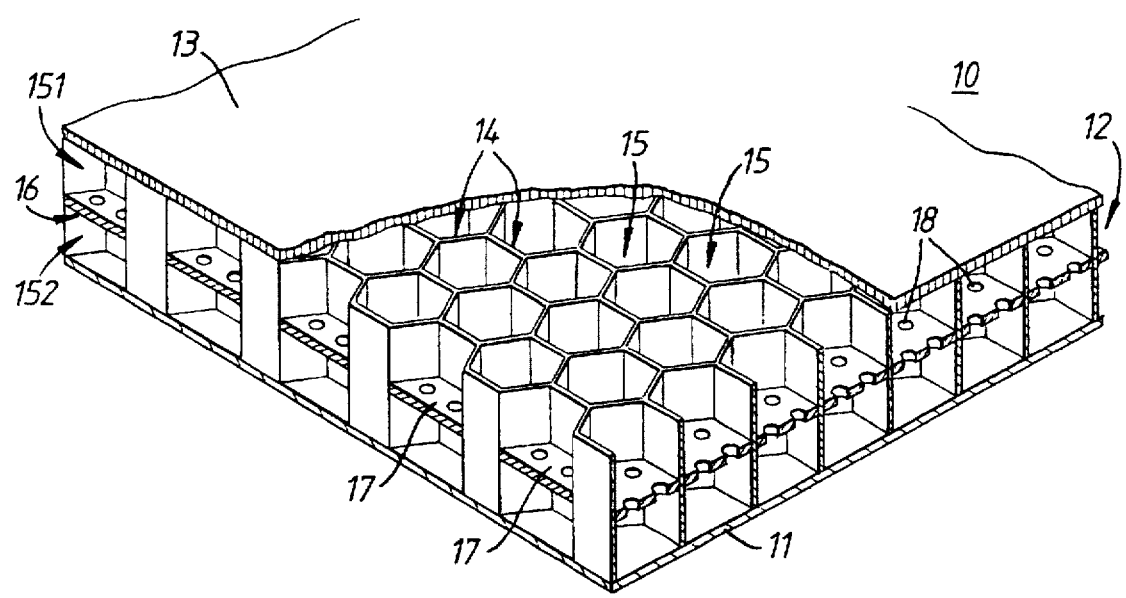
FIG. 1 is a schematic isometric view from above of a noise attenuation panel including a structural cellular component produced by the method according to the first aspect of the invention.
Figure 2:
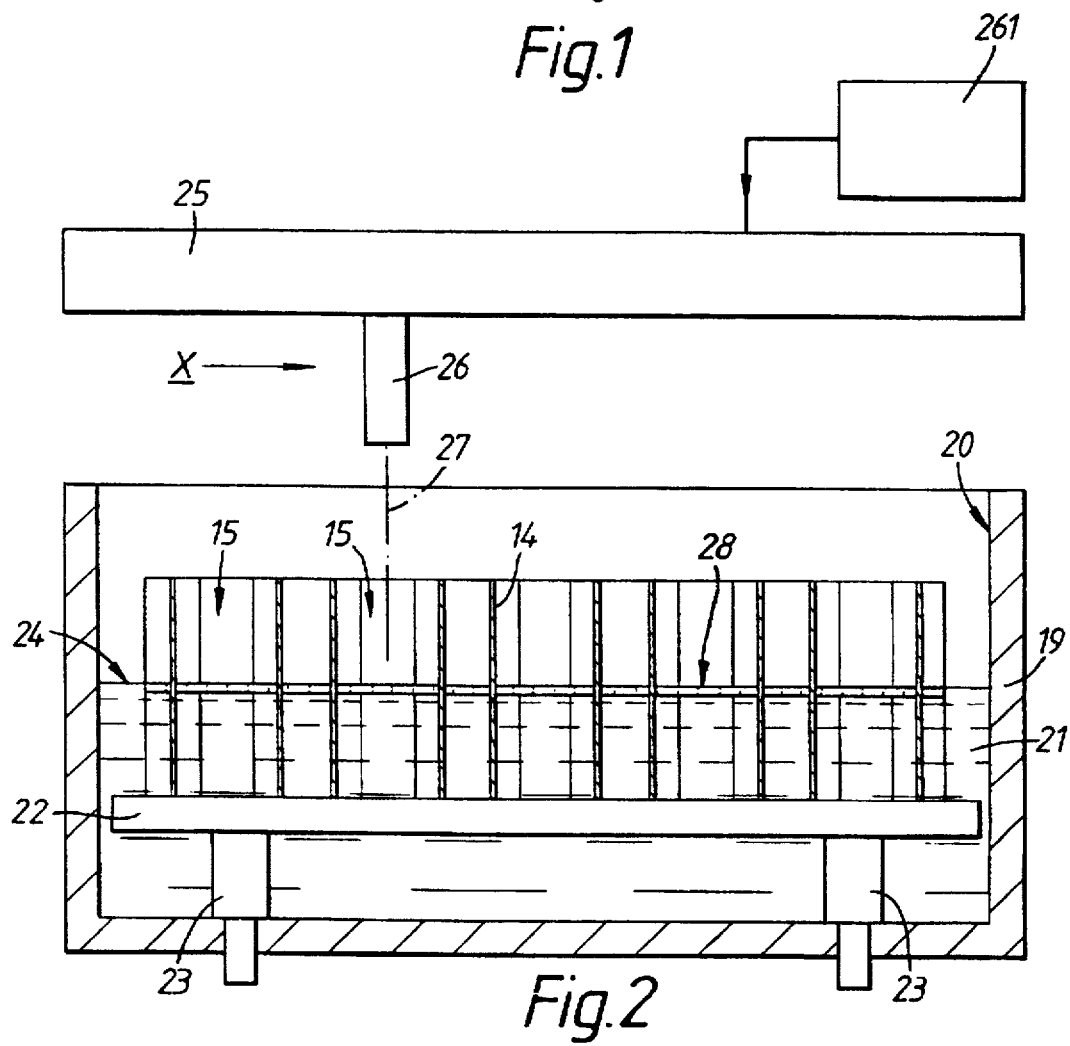
FIG. 2 is a schematic sectional view of a processing apparatus for use in producing a structural cellular component embodying within a primary wall structure of the component a secondary wall structure by the method according to the first aspect of the invention.

Referring first to FIG. 1 and 2, the noise attenuation panel 10 illustrated comprises a backing sheet 11, a structural cellular component 12 and a facing sheet 13. The structural cellular component 12 comprises a primary wall structure 14 forming a multiplicity of open-ended juxtaposed hexagonal primary cells 15 and a secondary wall structure 16 comprising apertured cell dividing wall portions 17 which divide each of the primary cells 15 into upper and lower subcells 151 and 152. The cell dividing portions 17 of the secondary wall structure 16 in the panel shown in FIG. 1 are formed with apertures 18 and provide an acoustic septum element within each primary cell 15 which divides each primary cell 15 acoustically into the two subcells 151 and 152.

The structural cellular component 12 of the panel 10 in FIG. 1 is in its simplest form in which the cell dividing portions 17 lie in a common plane and at a level within the primary cells midway between the open end adjacent the backing sheet 11 and the open end adjacent the facing sheet 13. This form of structural cellular component is well known in the art and is for example described and illustrated in the prior publications hereinbefore referred to. While it can be made by the methods described in the prior publications it can with great advantage be produced by the method according to the invention and as now to be described with reference to FIG. 2 and FIGS. 3A to 3E.

It is however to be understood that the method according to the first aspect of the invention and as now to be described for the production of the structural cellular component 12 can with equal or greater advantage also be employed for the manufacture of structural cellular components having secondary wall structures providing cell dividing portions of more complex form as well as secondary wall structures which provide cell dividing portions which serve to divide the primary cells into subcells which extend from the open end at the front face of the primary cell structure to the open end at the rear face of the primary cell structure.

Referring now to FIG. 2 the processing apparatus illustrated comprises a resin bath 19 open at its upper end 20 and containing a body 21 of photosensitive liquid resin within which is submerged a support table 22 which is movable upwardly and downwardly within the liquid 21 under the control of actuators 23. As will be seen, the liquid 21 is at a level within the bath 19 approximately halfway up the walls of the bath and presents an exposed upper surface 24.

Above the open end 20 of the bath 19 there is arranged a support frame 25 which carries a scanning laser 26 which directs a laser beam 27 vertically downwardly to impinge on the surface 24 of the liquid 21. A computer controlled drive 261 is provided for raster laser scanning of the surface 24 of the liquid 21 by movement of the laser 26 across the bath in the direction indicated by the arrow X followed by incremental movements in a direction at right angles to the direction of the arrow X. Although the frame 25 and the scanning laser 26 is shown in FIG. 2 in proximity to the open end 20 of the bath 19 it will in practice be located well above the open end 20 to permit access to the bath 19.

In the formation of structural cellular components 12 as shown in FIG. 1 by the method according to the first aspect of the invention, primary cell structures 14 are first formed by any one of a variety of well-known processes. A primary cell structure 14 thus formed is then lowered into the bath 19 so that one face thereof rests on the table 22. The actuators 23 are then raised or lowered to bring the primary cell structure 14 to a position in which it lies within the body of liquid 21 with the upper surface 24 of the liquid at a predetermined level at which the secondary wall structure 16 is to be formed within each cell.

With the primary wall structure 14 so positioned within the bath 19, the surface 24 is exposed to laser radiation by raster scanning of surface 24 by the scanning laser 26 to bring a surface layer 28 of the liquid 21 to a consolidated state within each of the primary cells 15 of the primary wall structure 14 thereby to form the cell dividing portions 17 of the secondary wall structure 16 or elemental parts of them.

The method in its simplest form can by an appropriate choice of photosensitive liquid resin and a Laser of adequate power produce cell dividing portions 17 of adequate thickness during one complete scanning of the surface 24 by the scanning laser 26.

Where however the consolidated layer produced during a single scan is of inadequate thickness or where the secondary wall structures or apertures therein are required to be of complex form then provision needs to be made for repeating the processing step to build up consolidated layer upon layer as hereinafter to be described.

It will be seen that the cell dividing portions 17 of the secondary wall structure in the cellular component 12 of the panel 10 in FIG. 1 have apertures 18 and scanning by the laser 26 needs to be so controlled as to subject the surface layer 24 of the liquid 21 to consolidating radiation over a predetermined area which excludes those specific areas in which an aperture 18 is to be provided.

Figure 3A:
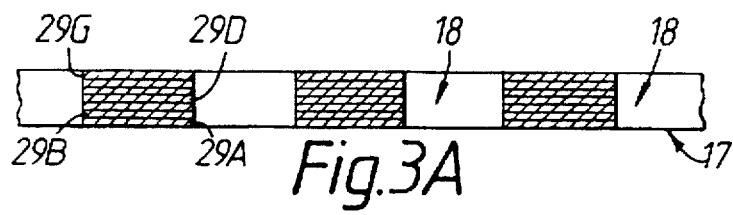
FIGS. 3A to 3F are schematic sectional scrap views of cell dividing portions of secondary wall structures in several different forms produced by the processing apparatus illustrated in FIG. 2.

Turning now to FIG. 3A the scrap section shown is of one of the cell dividing portions 17 produced in the processing apparatus shown in FIG. 2. It is produced by successive processing steps in which consolidated layers 29A to 29G are formed layer upon layer to provide a cell dividing portion 17 of appropriate thickness with apertures 18 at predetermined positions in the portion 17.

In carrying out the first processing step to form the first layer 29A of the cell dividing portion 17 the primary cell structure 14 is set by the table 22 at a position in which the liquid resin surface 24 is at a first predetermined level within the cells 15 of the structure 14. Scanning by the scanning laser 26 is then carried out to form the first consolidated layer 29A as described, the exposure of the surface layer 24 to the laser radiation being carried out in the predetermined area in which the layer 29A is required, whilst leaving the areas at which the apertures 18 are to be provided unexposed and in liquid form.

The table 22 in the resin bath 19 is then lowered causing the liquid within the cells 15 to pass through the apertures 18 created in the consolidated layer 29A and to bring the surface layer 24 of the liquid resin to a second predetermined level above that at which the layer 29A has been formed. A further processing step is then carried out by scanning of the newly formed liquid surface 24 by the scanning laser 26 over the same predetermined area employed to produce the consolidated layer 29A thereby to form a second consolidated layer 29B contiguous with and superposed on the layer 29A.

A predetermined number of further processing steps are then carried out, in each of which the table 22 is lowered to bring the liquid resin surface 24 to a new level above that of the previously consolidated layer and laser scanning carried out in the manner described to produce a new consolidated layer until a final layer 29G is formed to complete the formation of the cell dividing portion 17 as illustrated in FIG. 3A.

The photosensitive liquid resin 21 employed in the processing step for forming the cell dividing portions 17 shown in FIG. 3A is preferably such as rapidly to consolidate by heat curing of the resin following exposure to the laser radiation generated by the scanning laser 26. Synthetic resin materials particularly of use in forming the consolidated layers of the portion 17 are hereinafter set forth.

The material from which the primary wall structure 14 is made may be such that the layers 29A to 29G directly bond to the walls of the cells 15 so that the processing step which completes the final consolidating layer 29G of the cell dividing portion 17 in FIG. 3A completes the formation of a cell dividing portion 17 at a predetermined position within each of the cells 15. To ensure a good bond between the layers 29A and 29G and the primary wall structure 14 the latter may be pretreated with either a chemical etch dip or a cell wall coating dip.

When however the material from which the primary wall structure 14 is made is such that the consolidated layers 29A to 29G forming the cell dividing portion 17 of FIG. 3A do not bond to the walls of the cells 15 alternative arrangements need to be provided for maintaining the cell dividing portion 17 at its required position within the cell 15.

The cell dividing portions 17 of the secondary wall structure 16 of the component 12 shown in FIG. 1 are of simplest form with the portions 17 lying in a common plane and with the apertures 18 formed therein being of constant cross-section with their principal axes at right angles to the principal faces of the portion 17. While a secondary wall structure so formed may be found suitable for some applications, there are other applications which require apertures providing more complex communication paths between the subcells 151 and 152 of the primary cells 15.

While cell dividing wall portions with apertures other than those provided in the cell dividing portions 17 of the secondary wall structure shown in FIG. 1 could be acoustically advantageous, such use has not been explored principally for the reason that their production would give rise to serious manufacturing difficulties which even if overcome would lead to prohibitive manufacturing costs.

The method of manufacturing the cell dividing portion 17 of the secondary wall structure 16 of the component 12 as shown in FIG. 1 can however readily be modified to produce apertured cell dividing portions 17 within each primary cell 15 which include apertures providing complex communication paths between the subcells 151 and 152.

Figure 3B:
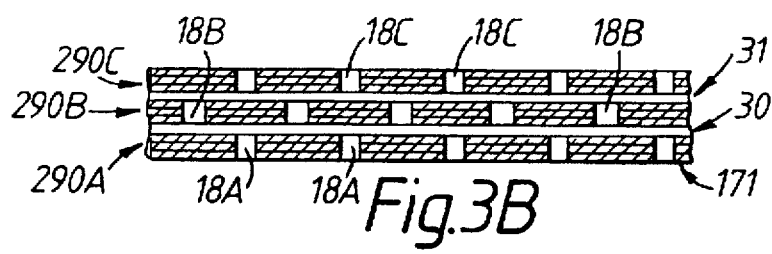

Turning now to FIG. 3B, it will be seen that the cell dividing portion 17 comprises a first group 290A of three apertured consolidated layers having apertures 18A and produced by successive consolidating steps as hereinbefore described followed by a second group 290B of three apertured consolidated layers similarly formed except insofar as the apertures 18B formed in them are offset from the apertures 18A in the group 290A and also except insofar that the first layer of the group 290B is spaced apart from the final layer of the group 290A by a predetermined spacing 30. The final group 290C of apertured consolidated layers is similarly formed except insofar as the apertures 18C formed in them are offset from the apertures 18B and in line with the apertures 18A and also except insofar that the first layer of the group 290C is spaced apart from the final layer of the group 290B by a predetermined spacing 31.

The cell dividing wall portion 171 shown in FIG. 3B subdivides the cell 15 into subcells 151 and 152 and provides extended communication paths between the two subcells by the offsetting of the apertures 18B laterally from the apertures 18A and 18C and by the provision of the spacings 30 and 31.

Figure 3C:
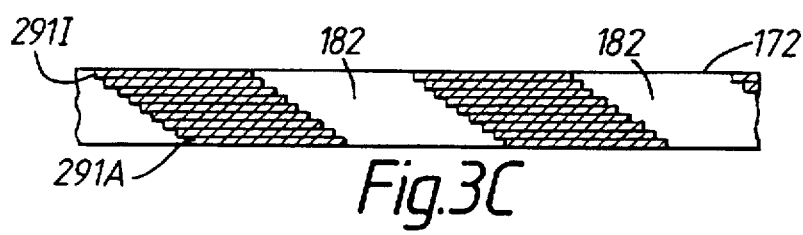

In a further arrangement as illustrated in FIG. 3C a cell dividing wall portion 172 is formed by building consolidated layers 291A to 291I in the same manner as the layers built up in the wall portion 17 in FIG. 3A except insofar that the predetermined area over which the liquid resin surface 24 is exposed to laser radiation is shifted laterally in the direction of the arrow X in FIG. 2 in the formation of successive consolidated layers to produce a completed cell dividing wall portion 172 in which the apertures 182 formed in it are of constant cross-section throughout but have principal axes inclined to the principal faces of the wall portion 172.

Figure 3D:
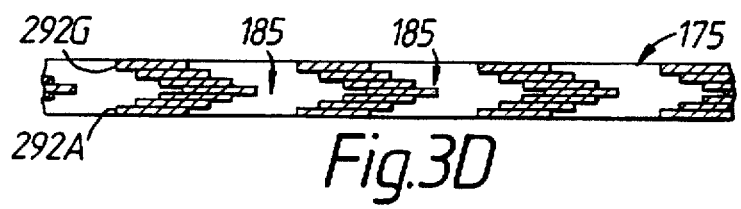

In a still further arrangement as illustrated in FIG. 3D a cell dividing wall portion 175 is formed by building consolidated layers 292A to 292G in the same manner as the layers built up in the wall portion 17 in FIG. 3A except insofar that the predetermined area over which the liquid resin surface 24 is exposed to laser radiation is shifted laterally in the direction of the arrow X in FIG. 2 in the formation of successive consolidated layers 292A to 292D and then in the opposite direction in the formation of the consolidated layers 292E to 292G to produce a completed cell dividing wall portion 175 in which the apertures 185 formed in it are of constant cross-section throughout but have a principal axis which is inclined first in one direction and then in another.

Figure 3E:
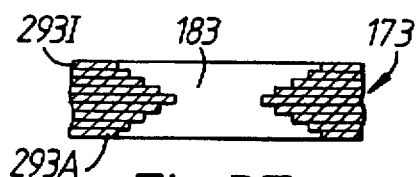

In yet a further arrangement as illustrated in FIG. 3E a cell dividing wall portion 173 is formed by building consolidated layers 293A to 293I in the same manner as the building up of layers in the wall portion 17A in FIG. 3A except insofar that the predetermined area of which the liquid resin surface 24 is exposed to laser radiation is varied in the formation of successive consolidated layers to provide apertures 183 each of which first reduces in cross-section by successive reductions in the area not exposed to laser radiation and then increases in cross-section by successive increases in the areas not exposed to laser radiation.

Figure 3F:
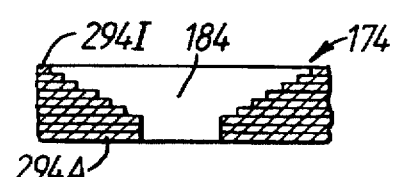

In still yet a further arrangement as illustrated in FIG. 3F a cell dividing wall portion 174 is formed by building consolidated layers 294A to 294I to produce apertures 184, each of which comprises a part of constant cross-section followed by a part of progressively increasing cross-section.

For the purpose of simplifying the description, the apertures produced in the cell dividing wall portions illustrated in FIGS. 3A to 3F have been taken to be apertures of circular cross-section. Where the production of apertured septum sheets as hitherto proposed are produced by drilling the apertures the aperture cross-section will of course be circular. No such limitation is however imposed by the method of production according to the first aspect of the present invention.

Clearly, in the formation of the apertured wall portions illustrated in FIGS. 3A to 3F the method of production in accordance with the first aspect of the invention and as described with reference to FIG. 2 aperture cross-sections of virtually any shape can be produced equally readily by an appropriate selection of the predetermined areas to be exposed to laser radiation and the areas not be exposed to the radiation.

Figure 4A:
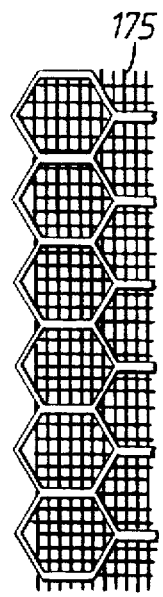
FIGS. 4A to 4E are schematic scrap plan view s of structural cellular components produced by the processing apparatus illustrated in FIG. 2, showing a primary wall structure embodying secondary wall structures in several alternative lattice configurations.
Figure 4B:
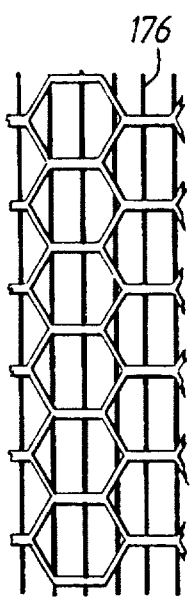
Figure 4C:
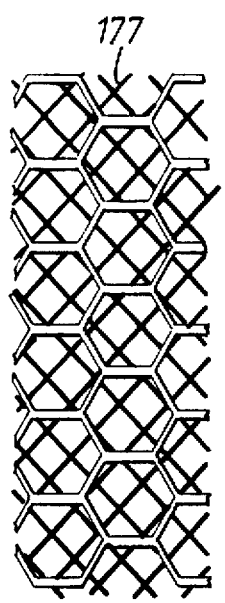
Figure 4D:
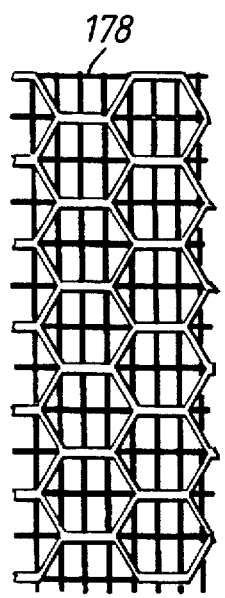
Figure 4E:
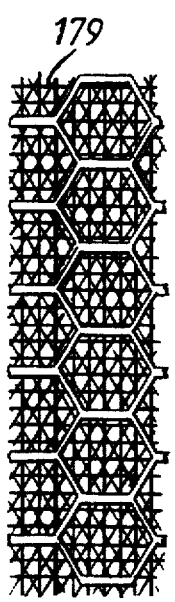

In particular, and as illustrated in FIGS. 4A and 4C to 4E the cell dividing wall portions 175, 177, 178 and 179 are formed as a lattice construction, while in FIG. 4B a cell dividing wall portion 176 takes the form of a grid of parallel elements.

The cell dividing wall portions 175 to 179 in FIGS. 4A to 4E may equally we be produced by the method according to the first aspect of the invention utilising the processing apparatus described with reference to FIG. 2, with the cell dividing portions being built up to a required thickness by the formation of successive consolidating layers or elemental parts as described with reference to FIGS. 3A to 3F.

The production of a structural component 12 having a secondary wall structure as illustrated in any of FIGS. 4A to 4E will depend largely upon the acoustic attenuation properties which can be achieved by subdivision in this way of the cells 15 of the primary cell structure 14.

The cell dividing wall portion 17 as illustrated in FIGS. 3A to 3F have been taken to be of constant thickness throughout their extent within the primary cell 15 in which they are located and indeed of a uniform thickness throughout the primary cell structure 14. It will however be apparent that for some applications it may be advantageous to have the thickness of the cell dividing wall portion 17 in one region of the primary wall structure 14 different from that at another region of the structure 14. Such variation in the thickness of the wall portion 17 from one group of cells 15 to another group of cells 15 can readily be accommodated by the method of production according to the first aspect of the present invention. It would simply require programming of the scanning laser 26 to increase or reduce the number of consolidated layers forming the cell dividing wall portions in different regions of the primary wall structure 14.

It will furthermore be appreciated that the method according to the first aspect of the invention can readily accommodate the production of cell dividing wall portions 17 in which the thickness of the wall portion varies within the bounds of each of the primary cells 15 of the primary wall structure 14.

Figure 5A:
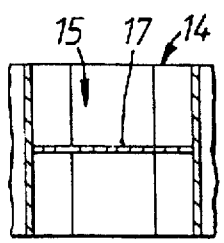
FIGS. 5A to 5F are schematic sectional scrap elevational views of cell dividing portions of secondary wall structures in several different forms produced by the processing apparatus illustrated in FIG. 2.
Figure 5B:
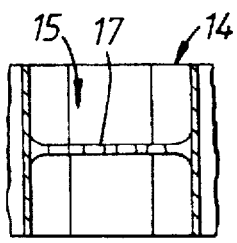
Figure 5C:
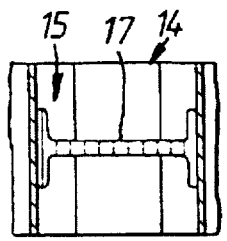
Figure 5D:
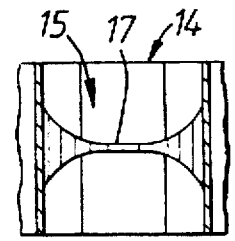
Figure 5E:
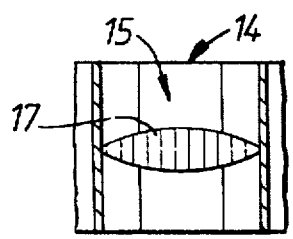

As illustrated in FIG. 5A the cell dividing wall portion 17 is of constant thickness within the bounds of the primary cell 15 and corresponds to the cell dividing wall portion 17 illustrated in FIG. 3A. In FIGS. 5B, 5C and 5D the cell dividing wall portion 17 within each cell 15 is formed with enlargements at each wall boundary, which can be readily produced using the processing steps carried out in the apparatus described with reference to FIG. 2.

Figure 5F:
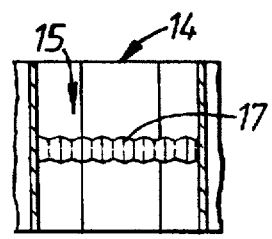

In yet a further arrangement illustrated in FIG. 2E the wall portion 17 extends inwardly from the walls of the cell 15 with progressively increasing thickness to reach a maximum thickness at the centre of the cell 15 and in an arrangement illustrated in FIG. 5F the wall portion 17 is of variable thickness with corrugated or undulating upper and lower surfaces, both of which arrangements can also be readily producing by the processing step carried out in the apparatus of FIG. 2.

In the arrangements illustrated in FIGS. 5A to 5F the cell dividing portion 17 within each primary cell 15 will be provided with apertures providing communication paths between the two subcells 151 and 152. The apertures may of course take any of the forms illustrated in FIGS. 3A to 3F or indeed any other form.

In the secondary wall structures 16 produced as hereinbefore described by the processing steps carried out in the apparatus illustrated in FIG. 2, the number of apertures 18 in each cell dividing wall portion 17 has been taken to be constant from cell to cell throughout the primary wall structure 14. While a regular array of apertures throughout the primary wall structure 14 may be appropriate for most applications, it may be to advantage for other applications to arrange for the number of apertures 18 within the cell dividing wall portions 17 to vary throughout the wall structure 14 with the aim of providing a structural component in which the acoustic absorbing characteristics vary from one region to another of the structural component 12 being formed.

Figure 6:
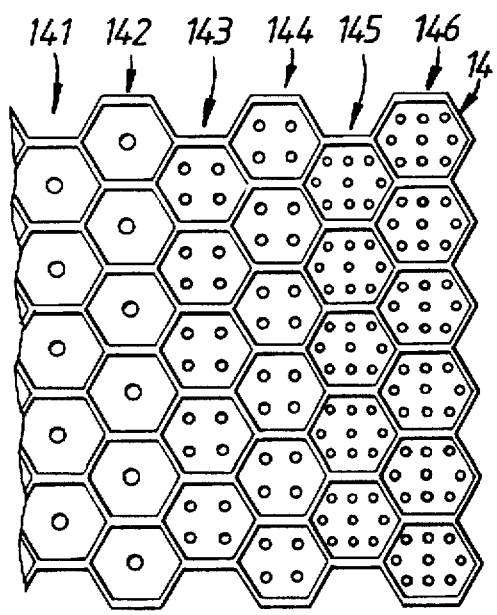
FIG. 6 is a schematic plan view of a structural cellular component produced by the processing apparatus of FIG. 2 and illustrating cell dividing portions of the secondary wall structure which are formed with one, four or nine apertures within each cell dividing portion.

As illustrated in FIG. 6, the primary wall structure 14 includes two rows 141 and 142 of primary cells 15 each of which contains a cell dividing wall portion 17 having a single central aperture 18, two further rows 143 and 144 of cells 15 in which each wall portion 17 includes four apertures 18 and rows 145 and 146 of cells 15 including wall portions containing nine apertures 18. Any other variations in the numbers and locations of the apertures 18 can of course also be accommodated.

In the secondary wall structures illustrated in FIGS. 3 A to 3F, 4A to 4E, 5A to 5F and FIG. 6 the cell dividing wall portions have been taken to lie within each primary cell 15 at the same level and to be in a common plane parallel to the front and rear faces of the primary wall structure 14. It will however be apparent that for some applications it will be to advantage to have the cell dividing wall portions 17 in one region of the primary wall structure 14 at a level different from that at another region of the structure. Such variation in the levels of the wall portions 17 can readily be accommodated in the method of production in accordance with the first aspect of the invention. Such variation is readily achieved by programming of the scanning laser 26 to build up consolidated layers in a first region of the primary wall structure 14 at a first level within the cells 15 in that region and then to proceed to build up consolidated layers in another region of the primary wall structure 14 at a different level within the cells 15 in that region.

In the production of the secondary wall structure 16, the wall portions 17 within each cell have been taken to be portions lying in a common plane or planes parallel to the front and rear faces of the primary wall structure 14. It will however be apparent that for some applications it may be to advantage to have the wall portions 17 inclined to the front face of the primary wall structure 14. The production of wall portions 17 so inclined can readily be accommodated by the method of production according to the first aspect of the invention. It would simply require programming of the scanning laser 26 to build up successive consolidated elemental parts to produce the inclined wall portion within each cell 15.

Structural components 12 having primary wall structures 14 with secondary wall structures 16 in a variety of forms different from that illustrated in FIG. 1 are shown as schematic scrap cross-sectional views in FIGS. 7A to 7H.

Figure 7A:
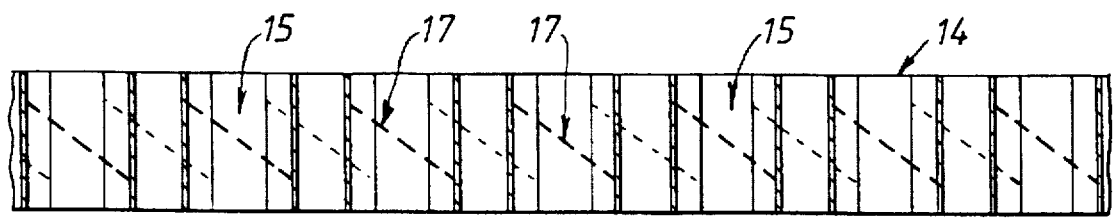

In FIG. 7A, the secondary wall structure 16 has cell dividing wall portions 17 each of which takes up an inclined position as shown within a primary cell 15 of the structure 14. Production of this secondary wall structure can be carried out by the method of production according to the first aspect of the invention, by appropriate programming of the scanning laser 26 to build up successive consolidated elemental parts within each of the primary cells 15.

Figure 7B:
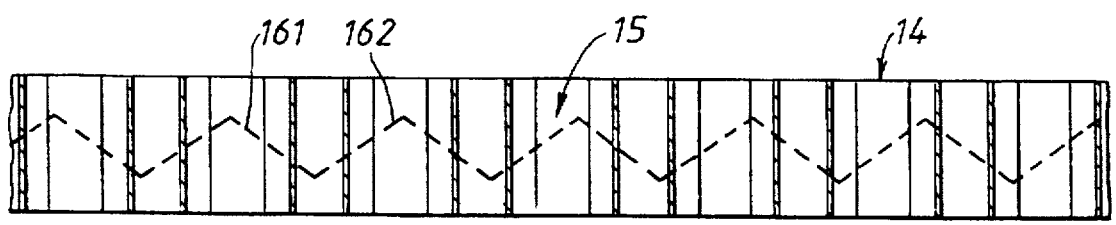

In FIG. 7B, the structural component 12 illustrated has a secondary wall structure which extends through the cells 15 of the primary wall structure in a sawtooth configuration either at constant pitch or at a varying pitch depending upon the specific acoustic attenuating requirements for the structural component. As will be apparent, the oppositely inclined ramp portions 161 and 162 of the secondary wall structure in the arrangement shown in FIG. 7B do not precisely follow the pitch of the primary cells 15 and as will be appreciated this presents no difficulty in production by the method according to the first aspect of the invention in which successive consolidated elemental parts are built up within the primary wall structure 14 to produce the ramp portions 161 and 162 of the structure 16.

Figure 7C:
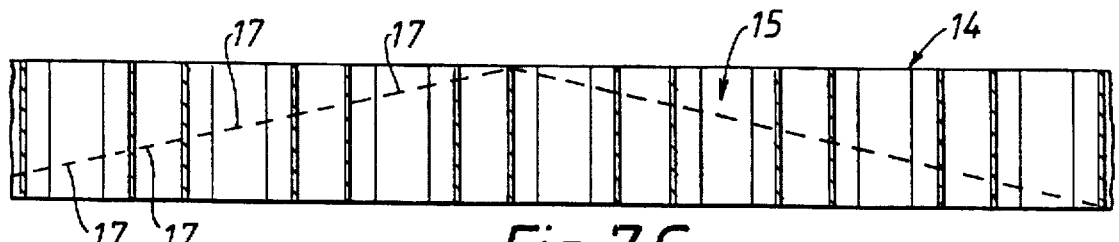

In FIG. 7C yet another arrangement is illustrated in which the secondary wall structure 16 is formed by cell dividing portions 17 which proceed from cell to cell in a first plane inclined at a predetermined angle to the front face of the primary wall structure 14 and then recede from the front face from cell to cell in an inclined plane extending from the front face at an angle equal to that of the first plane. Appropriate scanning by the scanning laser 26 can be carried out to build up successive consolidated elemental parts of the secondary wall structure 16 as illustrated and the production of a structural component as illustrated in FIG. 7C presents no difficulties. A secondary wall structure of pyramidal form may also be provided if desired.

Figure 7D:
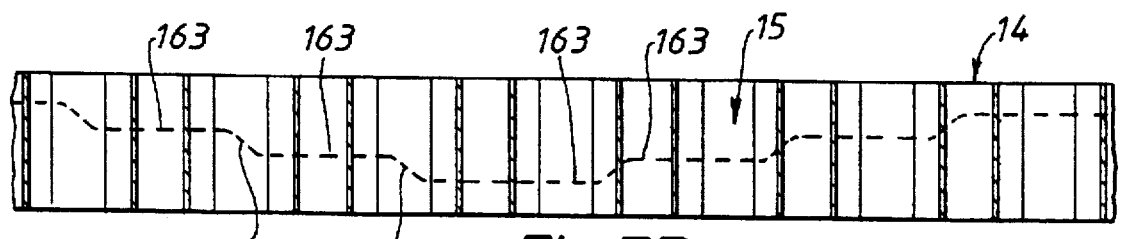

In FIG. 7D, the secondary wall structure 16 is made up of portions 163 parallel to the front face of the primary wall structure 14 and inclined portions 164 joining them. Again production of the secondary wall structure 16 by the method according to the first aspect of the present invention presents no difficulty and the configuration of the secondary wall structure 16 can be set to meet specific acoustic attenuation characteristics for the structural component formed.

Figure 7E:
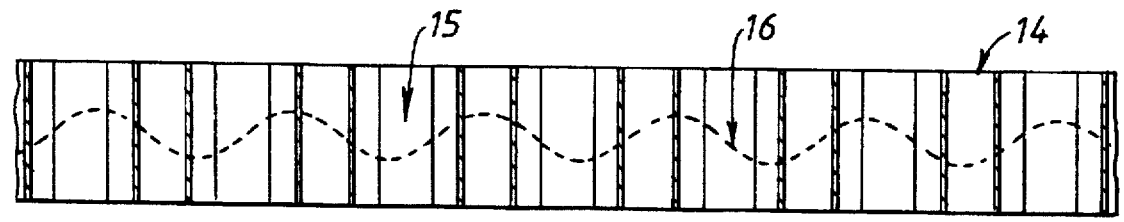

It will be apparent that all the secondary wall structures 16 hereinbefore set forth as suitable for production by the method according to the first aspect of the present invention have comprised planar portions only. It will however be appreciated that the secondary wall structure 16 can equally well be formed to follow a curved surface. In particular, the secondary wall structure 16 may follow an undulating surface as illustrated in FIG. 7E.

For some acoustic applications, it will be to advantage to provide a secondary wall structure 16 which divides each of the primary wall cells 15 into two or more subcells. For example, in an arrangement illustrated in FIG. 7F the primary cells 15 of the structure 14 are subdivided into three subcells by the provision of secondary wall structures 16A and 16B.

Such a division of the cells 15 as illustrated in FIG. 7F need not however be limited to secondary wall structures of planar configuration. For example, in an arrangement as illustrated in FIG. 7G the primary cells 15 of the structure 14 are subdivided into three subcells by the provision of two undulating secondary wall structures 16C and 16D. In the same way, the cells 15 in the arrangement illustrated in FIG. 7H are subdivided into three subcells by the provision of secondary wall structures 16E and 16F of sawtooth configurations.

In yet another arrangement as illustrated in FIG. 7H the cell dividing portions 17 of the secondary wall structure 16 lie on a curved surface in each of the primary cells 15 of the structure 14, which again presents no difficulty of production by the method according to the first aspect of the invention.

In the production of the secondary wall structure 16 in which the cell dividing wall portions are located in each of the primary cells 15, the wall portions 17 have been taken to be self-supporting. While this can be achieved if necessary by forming the wall portion 17 from an appropriate number of consolidated layers, it will be appreciated that for some purposes cell dividing wall portions 17 which are not self-supporting could be employed if support for them is provided by some form of support means. While such support means could present a major manufacturing obstacle where the structural component is formed for example by the methods disclosed in prior publications GB-A-2252076 and GB-B-2019983, the necessary support means can readily be formed as part of the secondary wall structure by the method according to the first aspect of the invention.

One such form of support is schematically illustrated in FIG. 8 which shows in isometric view and chain-dot line one primary cell 15 of the primary wall structure 14 and within it a support structure 32 formed by a first vertical support wall 33 and two transverse support walls 34 and 35. All three support walls 33, 34 and 35 extend from an open-ended face of the cell 15 to the level at which the cell dividing wall portion 17 is formed.

The production of the support walls 33, 34 and 35 and the cell dividing wall portion 17 can be carried out in the processing apparatus illustrated in FIG. 2 by the method according to the first aspect of the invention by the repeated processing steps of first forming consolidated elemental parts of the support walls 33, 34 and 35 and of then forming consolidated layers forming the cell dividing wall portion 17.

It will be apparent that the support structure 32 can take a variety of different forms and in addition to providing support for the wall portion 17 may also be used to improve the acoustic attenuating properties of the structural component being formed.

The secondary wall structures 16 produced by the method according to the first aspect of the invention and as hereinbefore specifically described have all included laterally extending cell dividing wall portions which extend across the cell 15 from one side to the other and have the effect of dividing the primary cells 15 into two subcells 151 and 152, one of which extends from the wall portion 17 to one open end of the cell 15 and the other of which extends from the other side of the wall portion 17 to the other open end of the primary cell 15. Such subdivision of the cells 15 accords with usual practice and the apertured cell dividing wall portions 17 achieve good acoustic attenuating properties. Nevertheless, good acoustic attenuating characteristics can be achieved for example by subdividing the cells 15 by an axially extending cell dividing wall portion which extends in an axial direction within the cell 15 from one end of the cell 15 to the other end to produce two or more axially extending subcells each of which extends from the front face of the primary wall structure 14 to the rear face and which is separated from the other subcell by the cell dividing wall portion extending through the cell.

Such division of the cells 15 of the primary wall structure 14 by axially extending cell dividing wall portions can be carried out by the method according to the first aspect of the invention by building up consolidated elemental parts of the structure part upon part throughout the full depth of the primary wall structure 14.

The secondary wall structures 16 having axially extending cell dividing wall positions can take a variety of different forms, but regardless of complexity of form they can be produced by building up the structure by repeated processing steps in the method according to the first aspect of the invention.

Such structural components 12 having primary wall structures 14 with secondary wall structures producing axially extending subcells are shown as schematic scrap plan views in FIGS. 9 A to 9D.

Figure 9A:
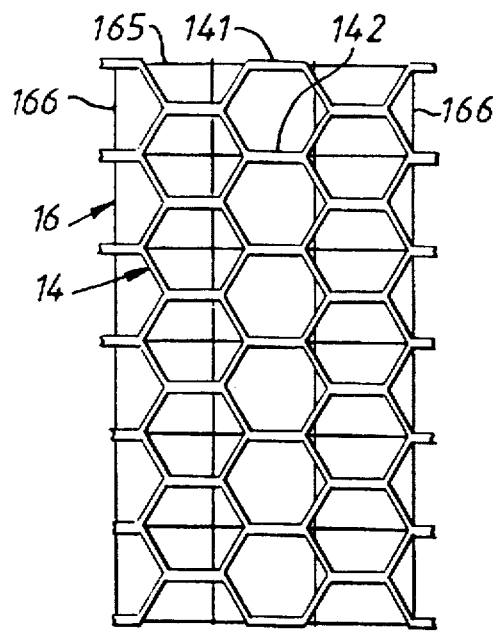
FIGS. 9A to 9D are schematic scrap plan views of structural cellular components the secondary wall structures of which are produced by the processing apparatus illustrated in FIG. 2, showing in several different forms secondary wall structures which divide the primary cells of the primary wall structure into subcells which extend from the front face to the rear face of the component.

In FIG. 9A, the secondary wall structure 16 is in the form of an array of walls 165 arranged parallel to each other and co-planar with walls 141 and 142 of the cells 15 and an array of walls 166 arranged in parallel relationship and at right angles to the walls 165.

Figure 9B:
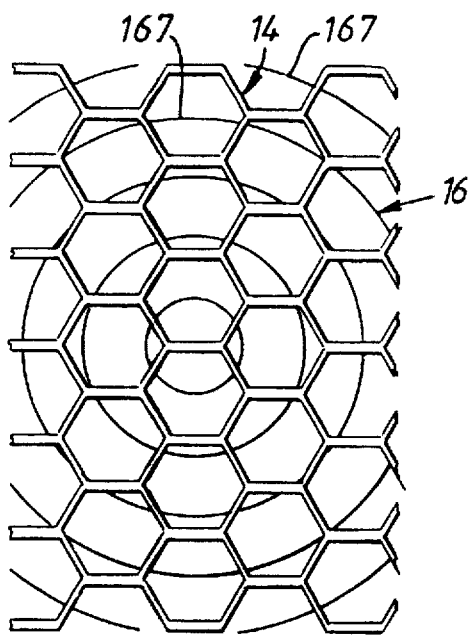

In FIG. 9B, the secondary wall structure 16 comprises walls 167 concentrically arranged with respect to each other and radially spaced from each other by a predetermined constant spacing.

Figure 9C:
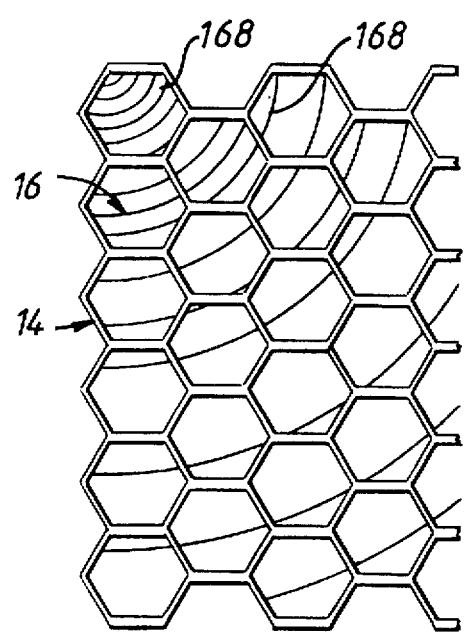

In FIG. 9C, the secondary wall structure 16 takes the form of concentrically arranged cell dividing walls 168 having varying radial spacings between adjacent pairs of walls 168.

Figure 9D:
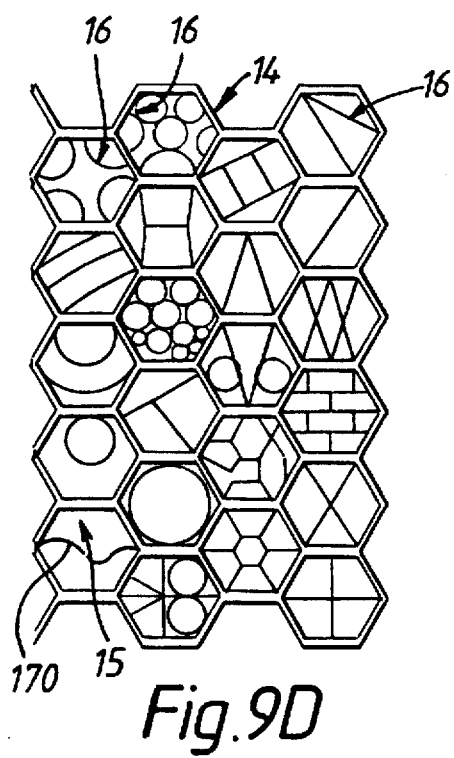

Finally, in FIG. 9D, alternative further forms of secondary wall structures are illustrated. Each cell 15 includes a cell dividing secondary wall structure 16 which would be repeated in each of the primary cells 15 for the structural component or part thereof to be formed.

Clearly, all the secondary wall structures 16 illustrated in FIGS. 9A to 9D can readily be formed within the primary cell structure 14 by the method according to the first aspect of the invention with the degree of complexity of the wall configurations imposing little or no adverse limitations on production.

With the facility of forming cell dividing wall portions of complex form in the primary cells 15 by the method according to the first aspect of the invention, the secondary wall structure can be arranged to have cell dividing wall portions which are so curved as to permit flexing of the primary wall structure 14 without fracture of the secondary wall structure. To this end, the wall portions within each primary cell 15 can be formed so as to follow a curved surface as illustrated for example by the wall portion 17 in the cell 15 shown in FIG. 7I and by the wall portion 170 in the cell 15 shown in FIG. 9D which includes a number of inflections.

A variety of different polymer materials may be used for the photosensitive liquid resin 21 in the bath 19. These include photosensitive polymers such as acrylate-acrylate/epoxy systems sold under Ciba Geigy XB5081-1, XB5139, XB5143, XB1549, XB5131, XB5154. A limited range of non Ciba Giegy resin systems may also be used as the liquid resin 21. For example, the liquid resin 21 may be a photosensitive polymer of the form sold by Dupont under references SOMOS 13100 and SOMOS 12100, and some Allied Signal SLA resins.

In the processing steps carried out in the processing apparatus shown in FIG. 2, successive consolidated layers or elemental parts of the secondary wall structure 16 have been built up by exposing predetermined areas of the liquid resin surface 24 of the liquid resin 21 provided in the resin bath 19. The liquid resin 21 has been chosen to be heat curable by exposure to the beam 27 of the scanning laser 26 and all the secondary wall structures hereinbefore described have been described as having been produced by the processing steps employed in the processing apparatus illustrated in FIG. 2. While the processing steps as described with reference to FIG. 2 advantageously form the consolidated layers by exposing the surface 24 of the liquid 21 to laser radiation the method according to the first aspect of the present invention can be carried out in alternative ways.

For example, the liquid resin 21 in the bath 19 may be replaced by two non-soluble liquids, one of which has a high viscosity and the other a low viscosity. The low viscosity liquid is in the form of the photosensitive liquid resin as used for the liquid 21 and floats on the high viscosity liquid which is non-reactive to the laser radiation. The formation of the consolidating layer or layers is then carried out by the processing steps employed in the processing apparatus illustrated in FIG. 2.

It will be appreciated that the low viscosity liquid resin layer can be arranged to have a depth above the surface of the non-reaction high viscosity liquid which would enable the resin to be cured in a single scan by the scanning laser 26 to form the secondary wall structure of the structural component 12 illustrated in FIG. 1.

Where, however the secondary wall structure 16 to be formed requires the provision of a succession of consolidated layers or elemental parts then the low viscosity photosensitive resin would need to have a depth sufficient to enable successive consolidated layers or parts to be formed and the table 22 progressively lowered as hereinbefore described.

In another example, the method according to the first aspect of the invention can be carried out by replacing the liquid 21 in the bath by a non-photosensitive liquid and arranging for a photosensitive layer in the form of a heat fusible powder to be applied to the surface of the body of liquid and then subjecting the powder layer to laser scanning to produce a powder sintered consolidated layer. Where a secondary wall structure 16 of the form shown in FIG. 1 needs to be provided then one or more processing steps would be carried out to sinter the heat fusible powder at the surface of the liquid in the bath. Where a more complex form of secondary wall structure is required a succession of consolidated layers or elemental parts of the structure would need to be formed in successive sintering steps following each of which an additional heat fusible powder layer would be provided to build up the next consolidated layer or part.

Where the secondary wall structure is formed by cell dividing wall portions 17 by the process of sintering a heat fusible powder to form the consolidated layers or elemental parts of the wall portion, the material chosen for sintering and the radiation provided by the laser can be made such as to produce a cell dividing wall portion 17 which is porous and permeable. Where this is done, communication paths between the subcells 151 and 152 formed within the primary cells 15 are provided within the sintered wall portion, and the apertures 18 in some acoustic applications may not need to be provided.

Examples of suitable thermoplastics materials for use as the heat-fusible powder to be sintered include polyether ketone, polyether ether ketone, polyaromatic ketone, polyphenylene sulphide, polyamide-imide, thermoplastic polyimide, polyether-imide, polyurethane and polyethylene.

The walls of the cells 15 of the cellular component 12 are preferably made from a non-porous impermeable sheet of any of the following materials:

(i) A thermoplastic such as polyether ether ketone and polyether-imide.
(ii) A polyester fabric/phenolic resin.
(iii) A fibreglass/phenolic resin.
(iv) A NOMEX/phenolic resin (NOMEX being a registered trade mark for an aramid fibre paper impregnated with various resins to produce a structural material and by "aramid is meant an aromatic polyamide polymer.)
(v) An aluminium alloy.

Where it is found that the processing steps for producing the secondary wall structure in the apparatus of FIG. 2 do not provide an adequate bond between the secondary wall structure and the cell walls of the primary wall structure, the latter may be pretreated with either a chemical etch dip or a cell wall coating dip. A suitable resin coating dip would be an Allied Signal Vinyl Ethers resin.

The facing sheet 13 of the acoustic panel 10 shown in FIG. 1 can take any one of a variety of different forms and in a specific embodiment, the facing sheet 13 comprising outer and inner facing sheets, the outer facing sheet being formed as a porous and permeable thermoplastics sheet produced by powder sintering the thermoplastics material.

Examples of suitable thermoplastics materials include polyether ketone, polyether ether ketone, polyaromatic ketone, polyphenylene sulphide, polyamide-imide, thermoplastic polyimide, polyether-imide, polyurethane and polyethylene.

The inner sheet is then made from an open square weave fabric formed from a carbon fibre-resin matrix composite material, the weave being such as to provide apertures constituted by the openings between adjacent warp and weft threads of the fabric. The fabric is preferably so woven as to produce a proportion of open aperture area relative to the total surface area of the sheet of 30% or substantially 30%. The fabric is also so woven that a relatively large number of its apertures are contained within the bounds of each cell 15 of the cellular component 12.

The backing sheet 11 is unperforated and made from a non-porous impermeable sheet material and is secured by an epoxy resin adhesive to the lower face of the cellular component 12. The backing sheet 11 may be made from any the following materials:

(i) A carbon/thermoplastic composite where for example the thermoplastic is polyether ether ketone, the material being automatically tape wound or hand laid.
(ii) A carbon/epoxy resin.
(iii) An aluminium alloy.

The epoxy adhesive may for example be obtained from Ciba-Geigy Plastics & Additives Company Limited of Cambridge, England. Adhesives and resins need not however be epoxy resin adhesives, but could for example be a phenolic, polyimide or thermoplastics resin.

The cells 15 are preferably provided with drainage slots (not shown) to allow for condensates to drain from the panel 10.

The method of production according to the first aspect of the invention is fast and cost effective because the perforated secondary wall structure is completed in a single process. For example, it requires no mandrel removal, there is no waste of resin and no separate perforation process is required. The cell dividing wall portions 17 of the septum forming secondary wall structure 16 do not have to be a heavy gauge and curing is rapid.

In the processing apparatus illustrated in FIG. 2, the laser 26 is shown as being mounted on the frame 25 for raster scanning movement across it. It will however be appreciated that alternative laser scanning arrangements can if desired be utilised.

For example, the laser generating device may be mounted in a fixed position on a support structure and the laser beam generated by it passed through a scanning optical system which produces the required raster scanning by the beam of the surface layer 24 of the photosensitive liquid 21 in the bath 19.

In carrying out the method of production in accordance with the present invention consideration should, however, be given to the following areas which could possibly give rise to difficulties:

(1) The degree of resistance of the primary wall structure 14 to the laser radiation needs to be considered. This may necessitate the use of aluminium alloy primary wall structure (or a carbon structure) although only the end section of polymeric cells 15 may be affected, which could be machined off subsequently (perhaps curing in a nitrogen atmosphere). It is however not anticipated that this will be a problem as several of the resins which can be used are highly reactive and it can be a relatively cool process.

(2) Resins which can be used in this process are traditionally "brittle". Although the secondary wall structure 16 is non load carrying a brittle resin may have a low acoustic fatigue resistance or more importantly it may make the primary wall structure difficult subsequently to form (and the secondary wall structure may get damaged in the forming operation). If this is found to be a problem the method could be developed to overcome it in a number of ways eg:

(a) Treatment of the secondary wall structure after cure to improve its toughness and flexibility eg chemical treatment or moisture treatment to lower its Tg.

(b) Heat forming: some of the laser reactive or photosensitive resins will soften at 'low' temperatures. As a consequence hot temperature forming may be an option. However the resin will have to remain stable at the bonding temperature so resins with the required properties are required.

(c) The addition or inclusion of discrete particles within the uncured resin mixture which would impart toughness and flexibility to the cured resin; such material could be an elastomer, fibrils etc.

(e) The shape of the lattice or pattern creating the perforations could be so chosen as to facilitate the subsequent forming operation of the structural component.

(3) During the curing operation the consolidated layers forming the cell dividing portions 17 of the secondary wall structure may need support. This is because the initial cured ply thickness can be very thin, non structural and consequently there is a risk it will flex or bend under its own weight. This can be overcome by curing very thin 0.002"/0.003" film supports as illustrated in FIG. 8. These can either be broken off manually, after the septum layer is fully cured, or left in place. They may furthermore help acoustically.

The method according to the first aspect of the invention can be used to produce unusual cell sizes and shapes to create a more acoustically efficient structure. This is achieved by producing a non-structural cell network within the primary wall structure 14. The structure 14 is required or used to create a structural panel (with skins etc). The light weight 'acoustic' subcells are created within the structure 14 using the new secondary cell network and can be produced in a very fine wall gauge, so that the weight penalty is minimal. The new secondary wall structure can either be porous or non porous. The structure 14 can also be porous or microporous. This will allow the acoustic liner designer a wide degree of freedom to produce locally reacting and extended reaction liners, with or without septums, and unusual cell sizes and shapes.

The freedom in septum design provided by the method according to the first aspect of the invention allows the acoustic engineer to study wave patterns of the frequencies which it is required to attenuate, and to design the optimum structural cellular component. The most practical method of doing this will be by septum layer configurations which are independent of the location of each cell of the primary wall structure. However it could eventually be done in an individual cell-by-cell basis. Similarly the cell sizes, shape and distribution could be optimised.

The liquid resins employed for production of the secondary wall structures are adhesives, and a good bond to the cell walls of the primary wall structure is expected. However, this will require that the curing laser will always be parallel with the cell walls. If only partial curing is achieved at the cell wall interface (due to shadowing etc.), the whole structure may be post cured in a multisource light chamber.

The forms which the primary wall structure 14 may take include hexagonal, reinforced, under expanded, over expanded, square, and flexi-core.

The materials from which the primary wall structure can be made include, light alloy, fibreglass, Nomex, Kraft, graphite and Kevlar. Various matrices include phenolic and epoxy polyimide (b-f).

Forms of resin plasticizers and toughening agents which can be used include:

(i) Fibres: Kevlar, calcium sulphate whisker, mineral fibres, polyamide, polyester, polyethylene, fibreglass several types e.g. E, S2 etc, carbon, boron, etc.

(ii) Discrete particles of thermoplastics: PEEK, PEK, PEKK, PPS, PEI, polyamide, polyethylene.

(iii) Elastomers: Neoprene, nitrile, natural rubber, butyl etc.

In the processing steps carried out in the process shown in FIG. 2, successive consolidated layers or elemental parts of the secondary wall structure 16 have been built up by exposing predetermined areas of the liquid resin surface 24 of the liquid resin 21 provided in the bath 19. While the liquid resin surface 24 has been subjected to heat curing by exposure to the beam of the scanning laser 26 the method according to the first aspect of the present invention can be carried out by exposing the surface 24 to other forms of radiation over the required predetermined areas to build up the consolidated layers or elemental parts of the structure 16.

For example, the radiation source may take the form of a non-localised radiation and the photosensitive liquid resin surface 24 exposed to radiation over the required predetermined areas by arranging for transmission of consolidating radiation from the source to the predetermined areas only. This may be achieved by interposing a stencil between the radiation source and the photosensitive liquid resin surface 24 to provide for exposure of the surface to consolidating radiation at a predetermined area only and changing the stencil for subsequent processing steps to vary the predetermined area of exposure.

Figure 10:
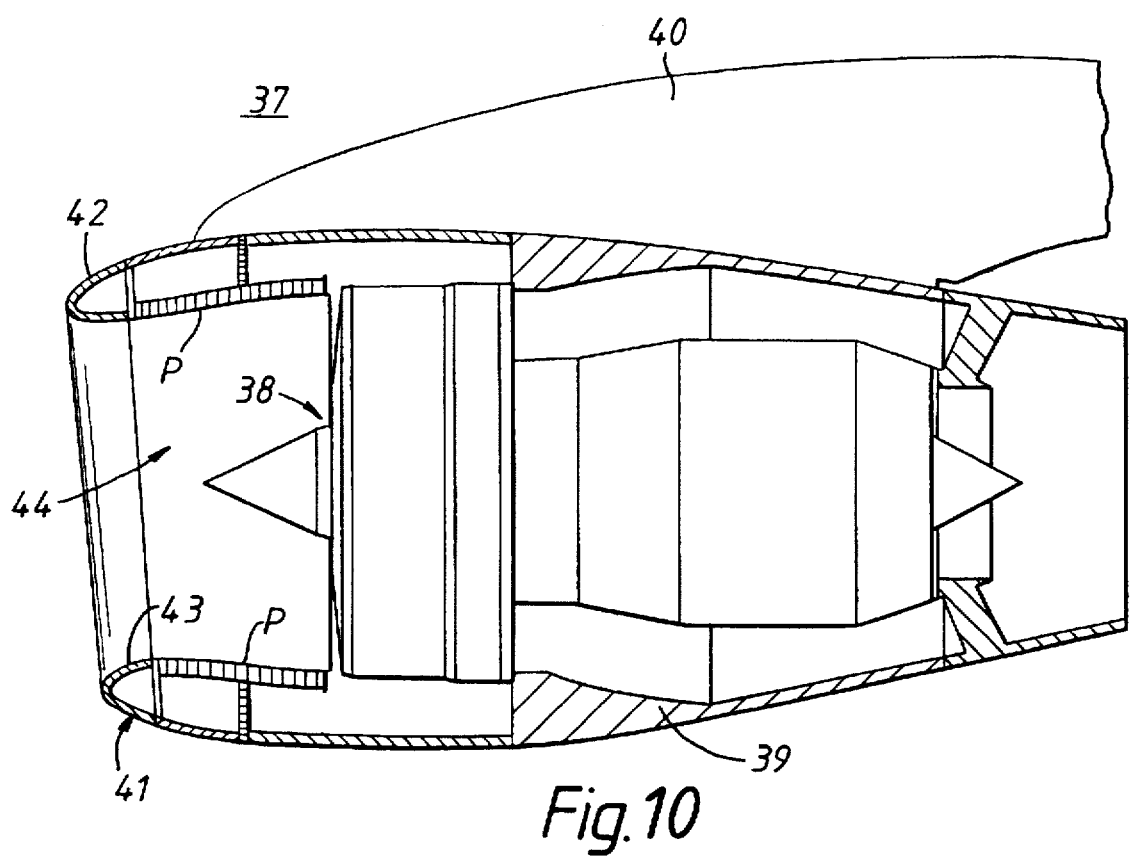
FIG. 10 is a schematic cross section of an aero engine including noise attenuation panels embodying structural cellular components which are produced in the processing apparatus shown in FIG. 2 by the method in accordance with the first aspect of the invention or which are in accordance with the second and third aspects of the invention.

Referring now to FIG. 10, an aero engine 37 is schematically illustrated and includes a turbofan power unit 38 mounted within a nacelle 39 suspended from a pylon 40. The nacelle 39 includes a nose cowl 41 having an outer wall 42 and an inner wall 43. The inner wall 43 is in part formed by noise attenuation panels P which include structural cellular components as hereinbefore described and produced by the method according to the invention. The panels 10 are arranged to form part of the inner wall of the nose cowl 41 in such disposition that the facing sheet 13 forms the wall surface defining the air intake duct 44 for the power unit 38. The panels P in this disposition serve to reduce noise created by the high speed flow of air which passes though the duct 44 over the facing sheets 13 of the panels P and into the power unit 38, as well as to reduce noise generated by the fan blades of the unit 38.

In the aero engine mounting arrangement illustrated in FIG. 4, the power unit is carried by the wing mounted pylon 40. It will however be appreciated that noise attenuation panels 10 according to the present invention may equally well be employed for reducing noise in other aero engine installations.

The secondary processing step described with reference to FIG. 2 may be carried out by stereolithography apparatus available on the market which utilises a point by point laser beam scanning of the photosensitive layer to be consolidated. Several stereolithography (SLA) systems which may be used and which employ point by point laser beam scanning are for example set out on page 20 of Volume 19 of "Manufacturing Research and Technology" edited by D Kochan and published by Elsevier, 1993 under the title "Solid Freeform Manufacturing (Advanced Rapid Prototyping)".

While the point by point laser beam scanning of the surface layer 24 of the liquid 21 in the bath 19 is to be preferred, the consolidating step can alternatively be carried out by exposing the photosensitive layer to a non-localised radiation source by arranging for transmission from the source to the layer through a stencil or mask interposed between the source and the layer. References made on page 20 of the Kochan publication include a Solider System of Cubital Limited which utilises non-localised radiation and stencils defining the areas of the photosensitive layer to be consolidated.

Where the photosensitive layer is a fine heat fusible powder, consolidation of the layer can be carried out by selective laser sintering (SLS) as referred to on page 21 of the Kochan publication which lists several selective laser sintering systems.

Comprehensive information of the systems referred to on pages 20 and 21 of the Kochan publication is given in the text of the publication to which reference may be made.

For ease of illustration and description the cell dividing portions 17 of the secondary wall structure 16 have been shown in FIG. 1 at locations midway between the open ends of the cells 15 of the primary wall structure 14 and as being formed at that location by the method according to the invention described with reference to FIG. 2. The location of the cell dividing portions 17 will however rarely be at the midway location. They could for example be at a depth in each primary cell of one quarter the depth of the primary cell 15 as measured from the open end adjacent the facing sheet 13. The actual ratio of the depth of the cell dividing portion 17 as measured from the facing sheet 13 to the full depth of the primary cells 15 will vary from one application to another and for example in the production of a noise attenuation panel for the intake of a turbine aero engine would depend on the output frequencies of the engine.

It will furthermore be appreciated that secondary wall structures 16 can be produced by the method according to the first aspect of the invention so as to extend through the primary wall structure 14 over localised areas or bands only of the primary wall structure depending upon the acoustic requirements of the noise attenuation panel to be produced. Panels so constructed would achieve the required acoustic attenuation characteristics while at the same time reduce the parasitic weight of the panel.

The method of producing the secondary wall structures 16 according to the first aspect of the invention furthermore facilitates the production of noise attenuation panels in which the primary and secondary wall structures 14 and 16 provide helmholtz arrays which extend over large areas, localised areas or local bands either at a constant depth or a varying depth by producing cell dividing portions 17 which are non-porous and imperforate and which are effective to reduce the depth of the primary cells 15 over the area or band to a fraction of the full depth of the primary cells 15 or at a varying depth over the area or band.

In particular, the formation of localised septum secondary wall structures can be combined with localised non-porous imperforate secondary wall structures to achieve an optimum ratio of the septum secondary wall structure depth in relation to the effective full depth of the primary cell 15. The ability to position the secondary wall structures as desired enables the acoustic engineer to target specific frequencies for attenuation without the need for complicated primary cell structure machining or the need for a complex shaped backing sheet in place of the backing sheet 11. In addition, minor acoustic attenuation modifications can be made without the need for redesigning of the primary wall structure and use of the method according to the first aspect of the present invention can be made for producing secondary wall structures which serve for structural purposes, such for example as for the encapsulation of potting compound for mechanical fasteners or for providing local structural build up, thereby further minimising the parasitic weight of the structural component being formed. In particular, the secondary wall structures may be vertically and/or horizontally arranged to create cells either smaller than the primary cells 15 of the primary wall structure 14 or shallower than them.

The method according to the first aspect of the invention furthermore facilitates the production of secondary wall structures composed of elemental parts which are non-porous and imperforate but which are hollow or include cavities which reduce further the parasitic weight of the structural component being produced.

While the embodiments of the invention hereinbefore described with reference to the drawings have been directed primarily to the structural components in which the primary wall structure 14 includes primary cells 15 having walls which are imperforate and a secondary wall structure 16 including cell dividing septum portions 17 which are apertured, the method according to the invention can equally well be applied for the production of structural components in which the primary wall structure is apertured or of a porous material.

In the embodiments of the invention hereinbefore described with reference to the drawings, the cell dividing portions 17 of the secondary all structure 16 have been shown as being formed by a succession of secondary processing steps in which photosensitive layers are successively exposed to the laser beam 27 over predetermined areas to bring the layers at those levels to consolidated states to form the wall structure layer upon a layer. It will however be appreciated that where the cell dividing portions 17 are simply required to lie in a horizontal plane or planes, it would not be necessary to build up the secondary wall structure by the production of a succession of layers layer upon layer, and a principal aim in these circumstances would be to produce the cell dividing portions 17 in a single pass of the laser beam 27 as clearly this will speed the process and reduce manufacturing costs. To achieve this end the resin could be cured in a single pass in any or all of the following ways:

1. Increasing the resin reactivity.
2. Slowing the speed of the laser (longer light exposure).
3. Increasing the laser intensity.

The method according to the first aspect of the invention has been described in relation to the production of a noise attenuation panel in which the facing sheet 13 comprises outer and inner facing sheets, the outer of which is formed of a porous permeable thermoplastics sheet produced by powder sintering the thermoplastic material and the inner of which is made from an open square weave fabric which serves to support the outer facing sheet. It will however be appreciated that the facing sheet 13 may take any one of a variety of alternative different forms. Panels in which the secondary wall structure 16 is formed by the method according to the first aspect of the invention may for example take the form of a simple liner, that is to say, one embodying a simple perforate facing sheet (composite or aluminium) and not a linear liner. The acoustic advantages of an in-line septum secondary wall structure currently appear so encouraging that a simple perforate facing sheet will suffice. Such use would clearly reduce the cost of manufacture of the panel.

What is claimed is:

1. A method of producing a structure which has a front face, a rear face, a primary wall structure which defines a primary cell which extends between the front face and the rear face and which is open to the front face and to the rear face of the component and a secondary wall structure within the primary wall structure which divides the primary cell into two or more subcells, the method comprising first forming in a primary processing step the primary wall structure and then in a secondary processing step forming the secondary wall structure or an elemental part thereof within the primary wall structure by bringing the primary wall structure into a condition in which it lies within a body of liquid the surface of which provides or is provided with a photosensitive layer and in which the photosensitive layer is at a predetermined level in the primary cell of the primary wall structure at which the secondary wall structure or the elemental part of the secondary wall structure is to be formed, and exposing the photosensitive layer to a radiation source over a predetermined area thereof to bring the photosensitive layer to a consolidated state within the primary cell of the primary wall structure to form the secondary wall structure or the elemental part thereof.

2. A method according to claim 1 wherein the primary cell of the primary wall structure is one of a plurality of juxtaposed primary cells each of which extends between the front face and the rear face of the component and is open to the front face and to the rear face of the component and wherein the secondary processing step comprises bringing the primary wall structure into a condition in which it lies within the body of liquid with the photosensitive layer being present in two or more of the cells and exposing the layer to the radiation source to produce a secondary wall structure or an elemental part thereof in two or more of the primary cells.

3. A method according to claim 1 wherein the predetermined level is a first of a plurality of predetermined levels in the or each primary cell, wherein an elemental part of the secondary wall structure is formed at the first predetermined level in the primary cell or cells and is a first of a plurality of elemental parts, and wherein the secondary processing step of forming the first elemental part is the first of a plurality of successive secondary processing steps in which photosensitive layers are successively positioned at the predetermined levels in the primary wall structure and exposed to the radiation source over predetermined areas thereof to bring the layers at those levels to consolidated states within the primary wall structure to form the secondary wall structure.

4. A method according to claim 3 wherein the secondary processing steps are carried out in such a manner as to from a secondary wall structure of contiguous elemental parts.

5. A method according to claim 1 wherein the predetermined area over which the photosensitive layer in the primary cell or one or more of the primary cells is exposed to the radiation source is such that the or each secondary wall structure or elemental part divides the primary cell or each of the primary cells into a first subcell which extends from the secondary wall structure towards the front face of the component and a second subcell which extends from the secondary wall structure towards the rear face of the component.

6. A method according to claim 5 wherein the predetermined area over which the photosensitive layer in the or each primary cell is exposed is so chosen as to produce in the primary cell or cells an apertured secondary wall structure or an apertured elemental part to provide communication between the two subcells.

7. A method according to claim 3 wherein the predetermined areas in successive processing steps are so selected as to form a secondary wall structure having one or more apertures therethrough which together produce a predetermined communication path or paths through the secondary wall structure.

8. A method according to claim 7 wherein the predetermined areas in successive secondary processing steps are so selected as to produce one or more communication paths, the or each of which is formed as an aperture which extends through the secondary wall structure and which is of constant cross section.

9. A method according to claim 8 wherein the predetermined areas in successive secondary processing steps are so selected that the principal axis of the or each aperture is a straight line perpendicular or inclined to the front face of the component.

10. A method according to claim 7 wherein the predetermined areas in successive secondary processing steps are so selected as to produce one or more communication paths the or each of which is formed as an aperture which extends through the secondary wall structure and which has a cross section which varies along its length.

11. A method according to claim 7 wherein the predetermined areas in successive secondary processing steps are so selected as to produce one or more communication paths the or each of which is formed by an aperture in each elemental part, which extends therethrough and which is offset from the aperture in the next succeeding elemental part and in which communication is provided between the apertures in adjacent elemental parts thereby to produce one or more communication paths the or each of which follows a prolonged course through the secondary wall structure.

12. A method according to 2 wherein the or each secondary processing step is such as to produce a cell dividing wall portion of the secondary wall structure or an elemental part thereof in each of the primary cells.

13. A method according to claim 12 wherein the secondary processing step is such as to produce a cell dividing wall portion of the secondary wall structure or an elemental part thereof in each of the primary cells which is co-planar with the other or others of the cell dividing wall portions or elemental parts thereof.

14. A method according to claim 13 wherein the secondary processing step is such that the cell dividing wall portions or elemental parts thereof formed in the primary cells lie in a plane parallel to the front face of the component.

15. A method according to claim 3 wherein the predetermined areas in successive secondary processing steps are so selected as to produce a secondary wall structure having a cell dividing portion which divides the primary cell into a first subcell which extends from the cell dividing portion towards the front face of the component and a second subcell which extends from the cell dividing portion towards the rear face of the component and a support portion which extends from the cell dividing portion to either the front face or the rear face of the component, whereby the cell dividing portion is held at the predetermined level within the primary cell by its support from the support portion.

16. A method according to claim 15 wherein the support portion is a support wall or walls which extends or extend from either the front face of the component or from the rear face of the component to the cell dividing portion.

17. A method according to claim 3 wherein the predetermined areas in successive secondary processing steps are so selected as to produce a secondary wall structure having two or more cell dividing portions which divide the or each primary cell into three or more subcells, a foremost of which extends from a foremost of the cell dividing portions to the front face of the component, a rearmost of which extends from the rearmost of the cell dividing portions to the rear face of the component with the or each intermediate subcell extending from one cell dividing portion to the other or the next cell dividing portion.

18. A method according to claim 3 wherein the predetermined areas in successive secondary processing steps are so selected as to produce a secondary wall structure having cell dividing wall portions which divide the or each primary cell into a first subcell which extends from the front face of the component to the rear face of the component and which is bounded by the secondary wall structure and a first part of the primary cell and a second subcell which extends from the front face of the component to the rear face of the component and which is bounded by the secondary wall structure and another part of the primary cell.

19. A method according to claim 18 wherein the predetermined areas in successive secondary processing steps are so selected as to produce a secondary wall structure in which the cell dividing wall portions lie in a plurality of surfaces which traverse the primary cell structure from one primary cell to another in a predetermined configuration.

20. A method according to claim 19 wherein the predetermined areas in successive secondary processing steps are so selected that the surfaces in which the wall portions lie form a concentric configuration.

21. A method according to claim 20 wherein the predetermined areas in successive secondary processing steps are so selected that the surfaces in which the cell dividing wall portions lie are arranged with a radial spacing between adjacent pairs of surfaces which is not constant.

22. A method according to claim 20 wherein the predetermined areas in successive secondary processing steps are so selected that the surfaces in which the cell dividing wall portions lie are arranged with a spacing between each pair of adjacent surfaces which is constant.

23. A method according to claim 19 wherein the predetermined areas in successive secondary processing steps are so selected that the cell dividing wall portions comprise a plurality of first wall portions which lie in spaced parallel first surfaces which extend in a first predetermined direction and a plurality of second wall portions which lie in spaced parallel second surfaces which extend in a second predetermined direction.

24. A method according to claim 23 wherein the predetermined areas in successive secondary processing steps are so selected that the first and second parallel surfaces are at right angles to each other.

25. A method according to claim 3 wherein the predetermined areas in successive secondary processing steps are so selected as to form a secondary wall structure which lies in a surface of pyramidal form.

26. A method according to claim 3 wherein the predetermined areas in successive secondary processing steps are so selected as to produce a secondary wall structure within the cell or cells which lies in a non-planar surface.

27. A method according to claim 3 wherein the predetermined areas in successive secondary processing steps are so selected and the material of the photosensitive layer so chosen as to form a secondary wall structure which is of a predetermined flexibility and which lies in a surface so curved as to permit flexing of the primary wall structure without fracture of the secondary wall structure.

28. A method according to claim 27 wherein the predetermined areas in successive secondary processing steps are so selected that the secondary wall structure comprises a wall portion which follows a curved surface having one or more inflections.

29. A method according to claim 1 wherein the primary wall structure is formed from a selected first material, wherein the photosensitive layer is formed from a selected second material which is bondable to the selected first material and wherein the step of bringing the photosensitive layer to the consolidated state within the or each primary cell bonds the secondary wall structure to the primary wall structure at the predetermined level in the primary cell.

30. A method according to claim 1 wherein the photosensitive layer is a photosensitive liquid layer at the surface of the body of liquid.

31. A method according to claim 30, wherein the body of liquid is a photosensitive liquid and the photosensitive layer is formed by the surface layer of the photosensitive liquid.

32. A method according to claim 1 wherein the photosensitive layer is a heat fusible powder layer which is applied to the surface of the body of liquid and which is consolidated in the predetermined area by sintering under radiation generated by the radiation source.

33. A method according to claim 1 wherein the radiation source is a laser beam generating and scanning device which so directs and activates the beam as to expose the photosensitive layer in the predetermined area to consolidate the layer in that area.

34. A method according to claim 1 wherein the radiation source provides a non-localised radiation and wherein the photosensitive layer is exposed to the radiation over the predetermined area by arranging for transmission of consolidating radiation from the source to the predetermined area only.

35. A method according to claim 34 wherein a stencil is interposed between the radiation source and the photosensitive layer which provides for exposure of the photosensitive layer to consolidating radiation at the predetermined area only.

36. A method according to claim 1 wherein the step of forming the primary wall structure in the primary processing step comprises forming a wall structure defining a plurality of juxtaposed cells and pretreating the walls of the cells by subjecting the structure to either a chemical etch dip or a cell wall coating dip to facilitate bonding of the secondary wall structure to the primary wall structure.

* * * * *